(12) United States Patent
Kim et al.

(10) Patent No.: US 11,784,347 B2
(45) Date of Patent: *Oct. 10, 2023

(54) ELECTROLYTE FOR RECHARGEABLE LITHIUM BATTERY AND RECHARGEABLE LITHIUM BATTERY INCLUDING SAME

(71) Applicant: Samsung SDI Co., Ltd., Yongin-si (KR)

(72) Inventors: Soojin Kim, Yongin-si (KR); Sangjae Park, Yongin-si (KR); Yongbeom Lee, Yongin-si (KR); Jeongdoo Yi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 472 days.

This patent is subject to a terminal disclaimer.

(21) Appl. No.: 17/041,414

(22) PCT Filed: Feb. 12, 2019

(86) PCT No.: PCT/KR2019/001688
§ 371 (c)(1),
(2) Date: Sep. 24, 2020

(87) PCT Pub. No.: WO2019/194407
PCT Pub. Date: Oct. 10, 2019

(65) Prior Publication Data
US 2021/0013546 A1    Jan. 14, 2021

(30) Foreign Application Priority Data

Apr. 3, 2018   (KR) .................. 10-2018-0038714

(51) Int. Cl.
*H01M 10/0567*   (2010.01)
*C07F 9/146*     (2006.01)
*H01M 10/052*    (2010.01)

(52) U.S. Cl.
CPC ........ *H01M 10/0567* (2013.01); *C07F 9/146* (2013.01); *H01M 10/052* (2013.01); *H01M 2300/0025* (2013.01)

(58) Field of Classification Search
None
See application file for complete search history.

(56) References Cited

U.S. PATENT DOCUMENTS

| 3,242,171 | A  | 3/1966 | Schmutzler |
| 9,450,249 | B2 | 9/2016 | Abe et al. |

(Continued)

FOREIGN PATENT DOCUMENTS

| EP | 1926172 A1 | 5/2008 |
| EP | 2615680 A1 | 7/2013 |

(Continued)

OTHER PUBLICATIONS

Machine translation of JP H08-321313 A (Year: 1996).*

(Continued)

*Primary Examiner* — Robert S Carrico
(74) *Attorney, Agent, or Firm* — Lewis Roca Rothgerber Christie LLP

(57) ABSTRACT

The present invention relates to an electrolyte for a rechargeable lithium, battery and a rechargeable lithium battery including same, wherein the electrolyte for a rechargeable lithium battery may comprise: a non-aqueous organic solvent, a lithium salt, a first additive containing a compound represented by chemical formula 1, and a second additive containing a magnesium salt.

11 Claims, 1 Drawing Sheet

(56) References Cited

U.S. PATENT DOCUMENTS

| | | | |
|---|---|---|---|
| 2004/0197667 A1* | 10/2004 | Noh | H01M 10/0569 429/339 |
| 2008/0118843 A1 | 5/2008 | Tarnopolsky | |
| 2009/0291370 A1 | 11/2009 | Kim et al. | |
| 2011/0236768 A1 | 9/2011 | Tani | |
| 2012/0070708 A1 | 3/2012 | Ohira et al. | |
| 2013/0177818 A1 | 7/2013 | Han et al. | |
| 2014/0193706 A1 | 7/2014 | Morinaka et al. | |
| 2014/0272604 A1 | 9/2014 | Lim et al. | |
| 2015/0357678 A1 | 12/2015 | Tsubouchi | |
| 2016/0056503 A1 | 2/2016 | Shatunov et al. | |
| 2016/0164143 A1 | 6/2016 | Sawa et al. | |
| 2016/0254567 A1 | 9/2016 | Cai et al. | |
| 2017/0331143 A1 | 11/2017 | Morinaka et al. | |
| 2019/0252724 A1* | 8/2019 | Shatunov | H01M 10/0567 |
| 2020/0052333 A1 | 2/2020 | Shatunov et al. | |
| 2020/0052334 A1 | 2/2020 | Shatunov et al. | |
| 2020/0052335 A1 | 2/2020 | Shatunov et al. | |
| 2020/0052336 A1 | 2/2020 | Shatunov et al. | |
| 2020/0052337 A1 | 2/2020 | Shatunov et al. | |
| 2020/0153045 A1 | 5/2020 | Choi et al. | |

FOREIGN PATENT DOCUMENTS

| | | | | |
|---|---|---|---|---|
| JP | 08321313 | A * | 12/1996 | |
| JP | WO2010/067549 | A1 | 6/2010 | |
| KR | 10-2009-0039211 | A | 4/2009 | |
| KR | 10-2009-0120961 | A | 11/2009 | |
| KR | 10-1075319 | B1 | 10/2011 | |
| KR | 10-2012-0042758 | A | 5/2012 | |
| KR | 10-2014-0104383 | A | 8/2014 | |
| KR | 10-2015-0022653 | A | 3/2015 | |
| KR | 10-2015-0078690 | A | 7/2015 | |
| KR | 10-2015-0114806 | A | 10/2015 | |
| KR | 10-2015-0139780 | A | 12/2015 | |
| KR | 10-2016-0024414 | A | 3/2016 | |
| KR | 10-1636427 | B1 | 7/2016 | |
| KR | 10-2017-0060779 | A | 6/2017 | |
| KR | 10-2018-0036340 | A | 4/2018 | |
| KR | 10-2019-0010318 | A | 1/2019 | |
| WO | WO 2016/088773 | A1 | 6/2016 | |
| WO | WO-2018062719 | A1 * | 4/2018 | C01G 51/42 |

OTHER PUBLICATIONS

Graeme A. Bell, et al., "Instant ligands. Part 1. Preparation of some Bidentate Fluorophosphine Ligands derived from Straight Chain Organic Substrates, and their Reactions to form Molybdenum Complexes", Journal of the Chemical Society, Dalton Transactions, 1986, vol. 8, pp. 1689-1692.

EPO Extended Search Report dated Jun. 30, 2020 for European Patent Application No. 17856605.5, 8 pages.

Kim, Young-Soo et al.; Succinonitrile as Corrosion Inhibitor of Copper Current Collectors for Overdischarge Protection of Lithium Ion Batteries; ACS Appl. Mater. Interfaces; 2014; 6 (3); pp. 2039-2043.

Korean Intellectual Property Office Action for Korean Patent Application No. 10-2018-0046909 dated Jul. 1, 2020, 7 pages.

Notice of Allowance for U.S. Appl. No. 16/335,240 dated Sep. 30, 2020, 5 pages.

Notice of Allowance for U.S. Appl. No. 16/575,244 dated Apr. 18, 2022, 7 pages.

Notice of Allowance for U.S. Appl. No. 17/023,272 dated Feb. 22, 2022, 7 pages.

Office Action for U.S. Appl. No. 16/335,240 dated May 14; 2020; 8 pages.

Office Action for U.S. Appl. No. 16/655,123 dated Aug. 6, 2020, 8 pages.

Reddy, G. S. et al.; "Nuclear Magnetic Resonance Studies on Fluorides of Trivalent Phosphorus", Z. Naturforschg., 1965, vol. 20b, pp. 104-109.

Notice of Allowance for U.S. Appl. No. 16/655,123 dated Dec. 16, 2020, 5 pages.

Notice of Allowance for U.S. Appl. No. 16/655,118 dated Feb. 17, 2021, 5 pages.

Notice of Allowance for U.S. Appl. No. 16/655,126 dated Feb. 24, 2021, 5 pages.

Notice of Allowance for U.S. Appl. No. 16/655,136 dated Mar. 31, 2021, 5 pages.

Notice of Allowance for U.S. Appl. No. 16/655,130 dated Apr. 1, 2021, 5 pages.

Office Action for U.S. Appl. No. 17/023,272 dated Nov. 5, 2021, 8 pages.

Office Action for U.S. Appl. No. 16/575,244 dated Dec. 24, 2021; 8 pages.

Office Action for U.S. Appl. No. 16/655,118 dated Sep. 1, 2020; 7 pages.

Office Action for U.S. Appl. No. 16/655,126 dated Oct. 7, 2020, 7 pages.

Office Action for U.S. Appl. No. 16/655,130 dated Nov. 12, 2020, 7 pages.

Office Action for U.S. Appl. No. 16/655,136 dated Nov. 12, 2020, 7 pages.

* cited by examiner

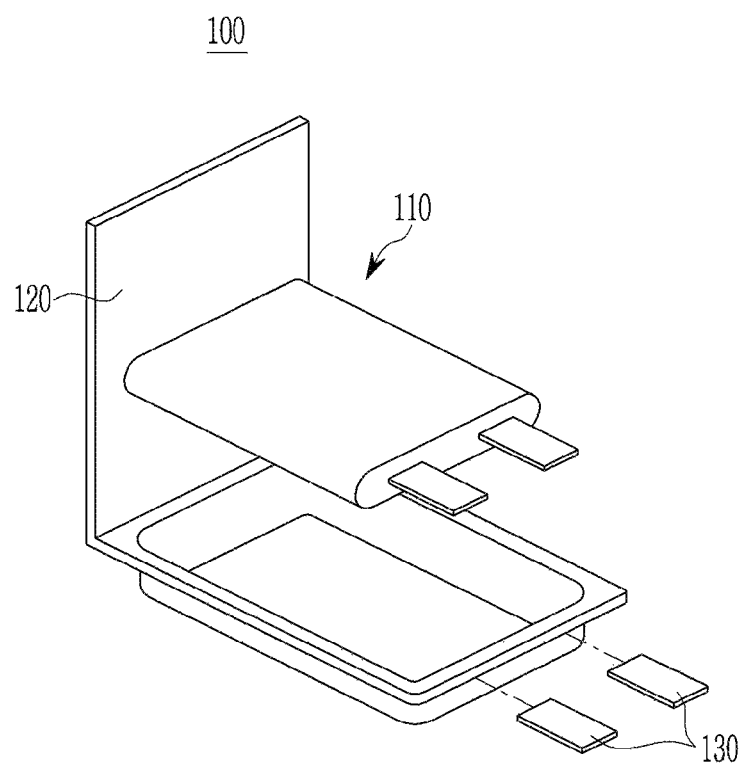

ELECTROLYTE FOR RECHARGEABLE LITHIUM BATTERY AND RECHARGEABLE LITHIUM BATTERY INCLUDING SAME

CROSS-REFERENCE TO RELATED APPLICATIONS

This application is a National Phase Patent Application of International Patent Application Number PCT/KR2019/001688, filed on Feb. 12, 2019, which claims priority of Korean Patent Application No. 10-2018-0038714, filed Apr. 3, 2018. The entire contents of both of which are incorporated herein by reference.

TECHNICAL FIELD

This disclosure relates to an electrolyte for a rechargeable lithium battery and a rechargeable lithium battery including the same.

BACKGROUND ART

A portable information device such as a cell phone, a laptop, a smart phone, and the like or an electric vehicle has used a rechargeable lithium battery having high energy density and easy portability as a driving power source.

Generally, the rechargeable lithium battery uses materials being capable of reversibly intercalating and deintercalating lithium ions as a positive active material and a negative active material, and is fabricated by providing an electrolyte between a positive electrode and a negative electrode.

As the positive active material of the rechargeable lithium battery, lithium-transition metal oxides are used, as the negative active material, carbonaceous materials are used, and as the electrolyte, lithium salts dissolved in a non-aqueous organic solvent are used.

Particularly, one important factor for improving performance of the rechargeable lithium battery is the use of a suitable electrolyte, and the characteristics of the battery are obtained due to a complicated reaction of the positive electrode and the electrolyte, or the negative electrode and the electrolyte.

DISCLOSURE

Technical Problem

One embodiment provides an electrolyte for a rechargeable lithium battery exhibiting good cycle-life characteristics and improved swelling characteristics at high temperature conditions, and a rechargeable lithium battery including the same.

Technical Solution

An electrolyte for a rechargeable lithium battery according to one embodiment may include a non-aqueous organic solvent, a lithium salt, a first additive including a compound represented by Chemical Formula 1, and a second additive including a magnesium salt:

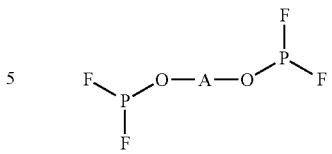

[Chemical Formula 1]

(wherein, A is a substituted or unsubstituted aliphatic chain or $(-C_2H_4-O-C_2H_4-)_n$, where n is an integer of 1 to 10).

The rechargeable lithium battery according to one embodiment may include a negative electrode, a positive electrode, and the electrolyte for a rechargeable lithium battery according to one embodiment.

Advantageous Effects

By including the electrolyte for a rechargeable lithium battery according to this disclosure, the gas generation amount and the resistance increases are inhibited so that a rechargeable lithium battery exhibiting good cycle-life characteristics and swelling characteristics in a high temperature environment may be realized.

BRIEF DESCRIPTION OF THE DRAWING

FIG. 1 illustratively shows a rechargeable lithium battery according to one embodiment.

MODE FOR INVENTION

Hereinafter, the present disclosure of various embodiments will be described more fully with reference to the accompanying drawing, in order for one ordinary skill in the related art to readily perform it. The present invention may be embodied in many different forms and is not to be construed as limited to the embodiments set forth herein.

In order to clearly illustrate the present invention, parts that are not related to the description are omitted, and the same or similar elements are denoted by the same reference numerals throughout the specification.

Furthermore, sizes and thicknesses of each element in the drawings are arbitrarily expressed for convenience of description, and thus, the present invention is not limited by the drawings.

In addition, unless explicitly described to the contrary, the word "comprise" and variations such as "comprises" or "comprising" will be understood to imply the inclusion of stated elements but not the exclusion of any other elements.

An electrolyte for a rechargeable lithium battery according to one embodiment may include a non-aqueous organic solvent, a lithium salt, a first additive including a compound represented by Chemical Formula 1, and a second additive including a magnesium salt:

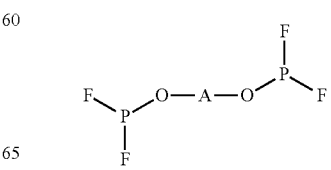

[Chemical Formula 1]

wherein, in Chemical Formula 1, A is a substituted or unsubstituted aliphatic chain or (—C₂H₄—O—C₂H₄—)ₙ, where n is an integer of 1 to 10.

In Chemical Formula 1, A is a $C_2$ to $C_{20}$ hydrocarbon chain or $(-C_2H_4-O-C_2H_4-)_n$, where n is an integer of 1 to 5.

Furthermore, the compound represented by Chemical Formula 1 may be a compound represented by Chemical Formula 1-1.

[Chemical Formula 1-1]

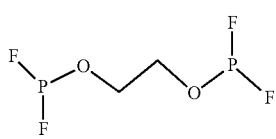

In case of applying an electrolyte with the additive including the compound represented by Chemical Formula 1 into a rechargeable lithium battery, the cycle-life characteristics of the rechargeable lithium battery may be surprisingly improved and the gas generation at high temperatures may be abruptly decreased.

This is because the compound represented by Chemical Formula 1 includes difluorophosphite (—OPF₂) having excellent electrical and chemical reactivity at both ends thereof.

Lithium ions are released from a lithium-transition metal oxide positive electrode at the initial charge of the rechargeable lithium battery and moved to the carbon negative electrode, thereby intercalating into carbons. Herein, lithium has strong reactivity to react with the carbon electrode, thereby generating $Li_2CO_3$, LiO, LiOH, etc., so that a thin layer on the surface of the negative electrode is formed. This thin layer is defined as an SEI (solid electrolyte interface) thin layer. The SEI thin layer formed at the initial charge prevents a reaction between lithium ions and the carbon negative electrode or other materials during charging and discharging. Furthermore, it acts as an ion tunnel to pass only lithium ions. Such an ion tunnel allows to solvate lithium ions and acts to inhibit breakage of the carbon negative electrode which is caused by co-intercalating organic solvents of the electrolyte having high molecular-weights moved together therewith, to the carbon electrode. Once the SEI thin layer is formed, lithium ions are not side-reacted with the carbon negative electrode or other materials, so that the amounts of lithium ions are reversibly maintained. Thus, a rigid SEL thin layer should be formed on the negative electrode in order to improve the cycle-life characteristics at high temperatures and power at low temperatures of the rechargeable lithium battery.

Further, as to the electrolyte for a rechargeable lithium battery according to this disclosure, an inclusion of the first additive including a compound represented by Chemical Formula 1 may form an SEI thin layer which is rigid and has good ion conductivity on the surface of the negative electrode, so that the decomposition of the surface of the negative electrode which may occur during the cycles at high temperatures may be inhibited and the oxidation reaction of the electrolyte may be prevented.

When the compound represented by Chemical Formula 1 is decomposed, a difluorophosphite (—OPF₂) group and ethylene dioxide fragments may be generated.

The difluorophosphite (—OPF₂) group has excellent electrical and chemical reactivity to produce a donor-acceptor bond with a transition metal oxide exposed on the surface of the positive active material, thereby forming a protection layer in the form of a composite.

Furthermore, the difluorophosphite (—OPF₂) group adhered to the transition metal oxide at the initial charge of the rechargeable lithium battery may be oxidized to a plurality of fluorophosphates, so that a non-activated layer which is stable and has excellent ion conductivity is formed on the positive electrode. Such a non-activated layer may inhibit the oxidation-decomposition of the other components of the electrolyte so that the cycle-life characteristics of the rechargeable lithium battery may be improved and the swelling phenomenon may be simultaneously prevented.

In addition, the compound represented by Chemical Formula 1 and oxides thereof participate in the electrical and the chemical reactions with the component of the SEI thin layer to form a more rigid SEI thin layer and improve the stability of the other constituent elements included in the electrolyte according to the oxidative decomposition.

The compound represented by Chemical Formula 1 may generate a composite with $LiPF_6$ to prevent the occurrence of the unwanted side-reaction, thereby improving the cycle-life characteristics of the rechargeable lithium battery and preventing gas generation inside of the rechargeable lithium battery, so that the defect occurrence rate due to the swelling phenomenon may be significantly decreased.

Meanwhile, the first additive including a compound represented by Chemical Formula 1 may be included at a range of 0.01 wt % to 5 wt % based on the total weight of the electrolyte for the rechargeable lithium battery. More specifically, the amount of the compound represented by Chemical Formula 1 may be 0.05 wt % to 3 wt % or 0.1 wt % to 1.0 wt %. When the amount of the first additive satisfies the above range, the resistance increase may be prevented, and thus the rechargeable lithium battery exhibiting excellent high-temperature storage characteristics may be realized.

Next, the second additive may include a magnesium salt.

The magnesium salt may be, for example, at least one of magnesium trifluoromethanesulfonate $(Mg(CF_3SO_3)_2)$, magnesium bis(trimethylsilyl) amide "$(Mg((C_3H_9Si)_2N)_2)$, and magnesium nitrate $(Mg(NO_3)_2)$.

Particularly, in one embodiment, the magnesium salt may be magnesium trifluoromethanesulfonate $(Mg(CF_3SO_3)_2)$. This is because the increase in the resistance may be effectively prevented after storing at high temperatures when the second additive includes magnesium trifluoromethanesulfonate, An amount of the second additive may be in the range of 0.01 wt % to 2 wt % based on the total weight of the electrolyte for a rechargeable lithium battery. More specifically, the amount of the second additive may be 0.1 wt % to 2 wt % or 0.5 wt % to 1.5 wt % based on the total weight of the electrolyte for a rechargeable lithium battery. When the amount of the second additive is within the above range and when the electrolyte for the rechargeable lithium battery according to this disclosure is applied to the rechargeable lithium battery, the increase in the resistance which may occur under the high-temperature storage environment may be effectively suppressed.

The amount ratio of the first additive and the second additive may be in the range of 0.5:1 to 1:1.5 by weight ratio. When the amount ratio of the first additive and the second additive is within the above range, and when the electrolyte for a rechargeable lithium battery according this disclosure is applied to the rechargeable lithium battery, the amount of generated gas may be effectively decreased even when it is stored in the high-temperature environment.

Next, the electrolyte for the rechargeable lithium battery may further include an auxiliary additive. The auxiliary additive may include, for example, a fluorine atom-included cyclic carbonate.

In one embodiment, the fluorine atom-included cyclic carbonate may be fluorinated ethylene carbonate (FEC).

An amount of the auxiliary additive may be 1 wt % to 15 wt % based on the total weight of the electrolyte for a rechargeable lithium battery. More specifically, the amount of the auxiliary additive may be 5 wt % to 10 wt %. When the amount of the auxiliary additive is within the above range, the battery resistance may be more effectively suppressed and the rechargeable lithium battery with the excellent cycle-life characteristics may be realized.

Meanwhile, the non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), ethyl methyl carbonate (EMC), ethylene carbonate (EC), propylene carbonate (PC), butylene carbonate (BC), and the like.

The ester-based solvent may include methyl acetate, ethyl acetate, n-propyl acetate, dimethyl acetate, methyl propionate, ethyl propionate, propyl propionate, γ-butyrolactone, decanolide, valerolactone, mevalonolactone, caprolactone, and the like.

The ether-based solvent may include dibutyl ether, tetraglyme, diglyme, dimethoxyethane, 2-methyltetrahydrofuran, tetrahydrofuran, and the like, and the ketone-based solvent may be cyclohexanone.

The alcohol-based solvent include ethyl alcohol, isopropyl alcohol, and the like, and examples of the aprotic solvent include nitriles such as T-CN (where T is a C2 to C20 linear, branched, or cyclic hydrocarbon, or may include a double bond, an aromatic ring, or an ether bond), amides such as dimethylformamide, dioxolanes such as 1,3-dioxolane, sulfolanes, and the like.

The organic solvent may be used alone or in a mixture. When the organic solvent is used in a mixture, the mixture ratio may be controlled in accordance with a desirable battery performance.

Specifically, in embodiments, the combination of the solvents may be, for example, a mixed solvent of ethylene carbonate (EC), propylene carbonate (PC), ethyl propionate (EP) and propyl propionate (PP). In the mixed solvent, ethylene carbonate:propylene carbonate:ethyl propionate: propyl propionate may be used at a volume ratio (EC:PC: EP:PP) of 5 to 35:0 to 15:5 to 80:5 to 75 based on the total mixed solvent.

In addition, the carbonate-based solvent may include a mixture of a cyclic carbonate and a linear (chain) carbonate. In this case, when the cyclic carbonate and the linear carbonate are mixed together in a volume ratio of 1:1 to 1:9, performance of an electrolyte may be enhanced.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 2.

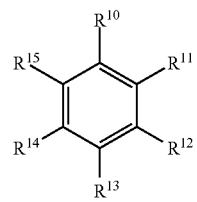

[Chemical Formula 2]

In Chemical Formula 2, $R^{10}$ to $R^{15}$ are the same or different and are selected from the group consisting of hydrogen, a halogen, a C1 to C10 alkyl group, a haloalkyl group, and a combination thereof.

Specific examples of the aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte for the rechargeable lithium battery may further include an ethylene carbonate-based compound of Chemical Formula 3 in order to improve cycle-life of a battery.

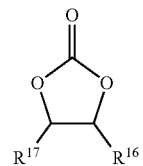

[Chemical Formula 3]

In Chemical Formula 3, $R^{16}$ and $R^{17}$ are the same or different and are selected from hydrogen, a halogen, a cyano group (CN), a nitro group ($NO_2$), and a fluorinated C1 to C5 alkyl group, provided that at least one of $R^{16}$ and $R^{17}$ is selected from a halogen, a cyano group (CN), a nitro group ($NO_2$), and a fluorinated C1 to C5 alkyl group, and $R^{16}$ and $R^{17}$ are not simultaneously hydrogen.

Examples of the ethylene carbonate-based compound may be difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving the cycle-life may be within an appropriate range.

The lithium salt dissolved in an organic solvent supplies a battery with lithium ions, basically operates the lithium secondary battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, and $LiN(C_xF_{2x+1}SO_2)(C_yF_{2y+1}SO_2)$, wherein x and y are natural numbers, for example an integer ranging from 1 to 20), LiCl, LiI, and $LiB(C_2O_4)_2$ (lithium bis(oxalato) borate: LiBOB). A concentration of the lithium salt may range from 0.1 M to 2.0 M. When the lithium salt is included at the above concentration range, an electrolyte may have excellent performance and lithium ion mobility due to optimal electrolyte conductivity and viscosity.

Hereinafter, the rechargeable lithium battery according to another embodiment of this disclosure will be described.

FIG. 1 schematically shows the structure of the rechargeable lithium battery of one embodiment of this disclosure.

Referring to FIG. 1, the rechargeable lithium battery 100 according to one embodiment may include an electrode assembly 110, a battery case 120 housing the electrode assembly 110, and an electrode tab 130 which serves as an electrical passage in order to induce a current generated in the electrode assembly 110 outward. Both sides of the battery case 120 are sealed by two overlapping sides facing each other. Furthermore, an electrolyte is injected into the battery case 120 housing the electrode assembly 110. The electrode assembly 110 includes a positive electrode, a negative electrode opposing the positive electrode, and a separator interposed between the positive electrode the negative electrode.

The positive electrode includes a current collector, and a positive active material layer formed on the current collector and including a positive active material.

In the positive active material layer, as the positive active material, a compound being capable of reversibly intercalating and deintercalating lithium (a lithiated intercalation compound) may be used, and specifically, one or more composite oxides of a metal selected from cobalt, manganese, nickel, or a combination thereof, and lithium, may be used. As more specific examples, compounds represented by one of the following chemical formulae may be used. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq s \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_\alpha$ ($0.90 \leq a \leq 1.8$, 0.5, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2PO_{43}$ ($0 \leq f \leq 2$); $Li_{(3-f)}Fe_2PO_{43}$ ($0 \leq f \leq 2$); and $Li_aFePO_4$ ($0.90 \leq a \leq 1.8$)

In the chemical formulae, A is selected from Ni, Co, Mn, or a combination thereof; X is selected from Al, Ni, Co, Mn, Cr, Fe, Mg, Sr, V, a rare earth element, or a combination thereof; D is selected from O, F, S, P, or a combination thereof; E is selected from Co, Mn, or a combination thereof; T is selected from F, S, P, or a combination thereof; G is selected from Al, Cr, Mn, Fe, Mg, La, Ce, Sr, V, or a combination thereof; Q is selected from Ti, Mo, Mn, or a combination thereof; Z is selected from Cr, V, Fe, Sc, Y, or a combination thereof; and J is selected from V, Cr, Mn, Co, Ni, Cu, or a combination thereof.

Particularly, the positive active material of this disclosure preferably includes cobalt. In case of including cobalt in the positive active material, the first additive including a compound represented by Chemical Formula 1 included in the electrolyte for the rechargeable lithium battery is adhered to the cobalt, thereby forming a thin layer.

More specifically, the positive active material may include Chemical Formula 4:

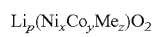

$$Li_p(Ni_xCo_yMe_z)O_2 \qquad \text{[Chemical Formula 4]}$$

wherein, in Chemical Formula 4, $0.9 \leq p \leq 1.1$, $0.5 \leq x \leq 0.98$, $0 < y \leq 0.3$, $0 < z \leq 0.3$, $x+y+z=1$, and Me is at least one from Al, Mn, Mg, Ti, and Zr.

More specifically, in the metal oxide included in the positive active material of this disclosure, that is, in Chemical Formula 4, x may be $0.7 \leq x \leq 0.98$.

The compounds may also have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound (for example, the method may include any coating method such as spray coating, dipping, and the like), but is not illustrated in more detail since it is well-known in the related field.

In the positive electrode, for example, a positive active material including two or more compounds of which chemical formulas are different may be used. Herein, if one of the two or more compounds is, for example, a compound represented by Chemical Formula 5, the compound represented by Chemical Formula 5 may be included at an amount of 30 wt % to 97 wt % based on the total weight of the positive active material.

In the positive electrode, an amount of the positive active material may be about 90 wt % to about 98 wt % based on a total weight of the positive active material layer.

In an embodiment of the present invention, the positive active material layer may further include a binder and a conductive material. Herein, each amount of the binder and the conductive material may be about 1 wt % to about 5 wt % based on the total weight of the positive active material layer.

The binder improves binding properties of positive active material particles with one another and with a current collector, and examples thereof may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity, and any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be an aluminum foil, a nickel foil, or a combination thereof, but is not limited thereto.

The negative electrode includes a current collector and a negative active material layer on the current collector and including a negative active material.

The negative active material is a material that reversibly intercalates/deintercalates lithium ions, a lithium metal, a lithium metal alloy, a material capable of doping and dedoping lithium, or a transition metal oxide.

The material that reversibly intercalates/deintercalates lithium ions is a carbon material, and may be any generally-used carbon-based negative active material in a rechargeable lithium battery. Examples thereof may be crystalline carbon, amorphous carbon, or a combination thereof. Examples of the crystalline carbon may be a graphite such as an unspecified shaped, sheet shaped, flake shaped, spherical shaped, or fiber-shaped natural graphite or artificial graphite, and examples of the amorphous carbon may be soft carbon or hard carbon, a mesophase pitch carbonized product, fired cokes, and the like.

The lithium metal alloy may include an alloy of lithium and a metal selected from the group consisting of Na, K, Rb, Cs, Fr, Be, Mg, Ca, Sr, Si, Sb, Pb, In, Zn, Ba, Ra, Ge, Al, and Sn.

The material capable of doping and dedoping lithium may be Si, $SiO_x$ ($0<x<2$), a Si-Q alloy (wherein Q is an element selected from the group consisting of an alkali metal, an alkaline-earth metal, a Group 13 element, a Group 14 element, a Group 15 element, a Group 16 element, a transition element, a rare earth element, and a combination thereof, and is not Si), a Si-carbon composite, Sn, $SnO_2$, a Sn—R alloy (wherein R is an element selected from the group consisting of an alkali metal, an alkaline-earth metal, a Group 13 element, a Group 14 element, a Group 15 element, a Group 16 element, a transition element, a rare earth element, and a combination thereof, and is not Sn), a Sn-carbon composite, and the like, and at least one thereof may be mixed with $SiO_2$. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

Specifically, the negative active material may be, for example, a silicon-carbon composite including crystalline carbon and silicon particles. Herein, the silicon particles included in the silicon-carbon composite may have an average diameter of 10 nm to 200 nm. Furthermore, the silicon-carbon composite may include an amorphous carbon layer on at least part thereof.

In embodiments, the negative active material may include at least two or more types of compound. For example, the negative active material may include the silicon-carbon composite and crystalline carbon.

Herein, the negative active material including the two or more types may be formed in the form of a single negative active material layer, or in the form of multiple negative active material layers.

The multiple negative active material layers may be in the form of, for example, a first negative active material layer including a first negative active material, and a second negative active material layer formed on the first negative active material layer and including a second negative active material which is different from the first negative active material. More specifically, for example, the first negative active material may include the silicon-carbon composite, and the second negative active material may include crystalline carbon.

As the transition elements oxide, lithium titanium oxide may be used.

In case of particularly including silicon as the negative active material, the improvements for the swelling characteristics, the resistance characteristics, and the cycle-life characteristics are excellent, when the electrolyte for a rechargeable lithium battery according to one embodiment is used.

Meanwhile, the negative active material layer may include a binder, and optionally a conductive material.

In the negative active material layer, an amount of the negative active material may be 95 wt % to 99 wt % based on a total amount of the negative active material layer.

When the negative active material layer includes the negative active material including silicon, the silicon may be included at an amount of 3 wt % to 50 wt % based on the total weight of the negative active material layer.

In the negative active material layer, an amount of the binder may be 1 wt % to 5 wt % based on a total amount of the negative active material layer. When the conductive material is further included, 90 wt % to 98 wt % of the negative electrode active material, 1 wt % to 5 wt % of the binder, and 1 wt % to 5 wt % of the conductive material may be used.

The binder serves to adhere the negative electrode active material particles to each other and to adhere the negative electrode active material to a current collector. The binder may include a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a C2 to C8 olefin copolymer, a copolymer of (meth)acrylic acid and (meth)acrylic acid alkylester, or a combination thereof.

When the water-soluble binder is used as the negative binder, a cellulose-based compound may be further used to provide viscosity as a thickener. The cellulose-based compound includes one or more of carboxy methyl cellulose, hydroxypropyl methylcellulose, methyl cellulose, or alkali metal salts thereof. The alkali metal may be Na, K, or Li. Such a thickener may be included in an amount of 0.1 parts by weight to 3 parts by weight based on 100 parts by weight of the negative electrode active material.

The conductive material is included to provide electrode conductivity, and any electrically conductive material may be used as a conductive material unless it causes a chemical change in a battery. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The positive active material layer and the negative active material layer may be prepared by mixing the active material, the binder, and optionally, the conductive material in a solvent to prepare an active material composition and coating the composition on the current collector. The manufacturing method of the electrode is well known, and thus is not described in detail in the present disclosure. The solvent includes N-methylpyrrolidone and the like, but is not limited thereto. In addition, when a water-soluble binder is used for the negative active material layer, water may be used as a solvent when preparing a negative active material composition.

The separator may use polyethylene, polypropylene, polyvinylidene fluoride, or multi-layers thereof having two or more layers, and may be a mixed multilayer such as a polyethylene/polypropylene double-layered separator, a polyethylene/polypropylene/polyethylene triple-layered separator, a polypropylene/polyethylene/polypropylene triple-layered separator, and the like.

Hereinafter, examples of the present invention and comparative examples are described.

Example 1

(1) Preparation of Positive Electrode and Negative Electrode

A $LiNi_{0.8}Co_{0.1}Al_{0.1}O_2$ positive active material at 97.3 wt %, polyvinylidenefluoride at 1.4 wt % as a binder, and ketjen black at 1.3 wt % as a conductive material were mixed and dispersed in N-methylpyrrolidone to prepare a positive active material slurry. The positive active material slurry was coated on an aluminum foil, dried, and compressed to prepare a positive electrode.

A graphite negative active material at 98 wt %, a polyvinylidenefluoride binder at 1 wt %, and ketjen black at 1 wt % as a conductive material were mixed and dispersed in N-methylpyrrolidone to prepare a negative active material layer composition, and it was coated on a copper foil, dried, and compressed to prepare a negative electrode.

(2) Preparation of Electrolyte 1.15M $LiPF_6$ was added to a solvent of ethylene carbonate (EC), propylene carbonate (PC), ethyl propionate (EP), and propyl propionate (PP) (volume ratio of EC:PC:EP:PP=20:10:20:50) to prepare a first mixed solution.

Based on 100 wt % of the first a mixed solution, a compound represented by Chemical Formula 1-1 at 1 wt %, fluorinated ethylene carbonate (FEC) at 7 wt % and magnesium trifluoromethanesulfonate ($Mg(CF_3SO_3)_2$) at 0.5 wt % were added thereto prepare an electrolyte for a rechargeable lithium cell.

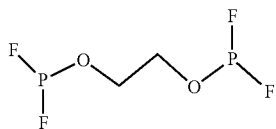

[Chemical Formula 1-1]

(3) Fabrication of Rechargeable Lithium Cell

Using the positive electrode and the negative electrode prepared in (1), and the electrolyte prepared in (2), a polymer full cell was fabricated by laminating the electrodes to produce an electrode assembly and inserting the electrode assembly into a pouch according to the general method.

Comparative Example 1

(1) Preparation of Positive Electrode and Negative Electrode

A positive electrode and a negative electrode were prepared by the same procedure as in Example 1.

(2) Preparation of Electrolyte 1.15M $LiPF_6$ was added to a solvent of ethylene carbonate (EC), propylene carbonate (PC), ethyl propionate (EP), and propyl propionate (PP) (volume ratio of EC:PC:EP:PP=20:10:20:50) to prepare a first mixed solution.

Based on 100 wt % of the first mixed solution, fluorinated ethylene carbonate (FEC) at 7 wt % was added thereto to prepare an electrolyte for a rechargeable lithium cell.

(3) Fabrication of Rechargeable Lithium Cell

Using the positive electrode and the negative electrode prepared in (1), and the electrolyte prepared in (2), a polymer full cell was fabricated by laminating the electrodes to produce an electrode assembly and inserting the electrode assembly into a pouch according to the general method.

Comparative Example 2

(1) Preparation of Positive Electrode and Negative Electrode

A positive electrode and a negative electrode were prepared by the same procedure as in Example 1.

(2) Preparation of Electrolyte 1.15M $LiPF_6$ was added to a solvent of ethylene carbonate (EC), propylene carbonate (PC), ethyl propionate (EP), and propyl propionate (PP) (volume ratio of EC:PC:EP:PP=20:10:20:50) to prepare a first mixed solution.

Based on 100 wt % of the first mixed solution, fluorinated ethylene carbonate (FEC) at 7 wt % and magnesium trifluoromethanesulfonate ($Mg(CF_3SO_3)_2$) at 0.5 wt % were added thereto to prepare an electrolyte for a rechargeable lithium cell.

(3) Fabrication of Rechargeable Lithium Cell

Using the positive electrode and the negative electrode prepared in (1), and the electrolyte prepared in (2), a polymer full cell was fabricated by laminating the electrodes to produce an electrode assembly and inserting the electrode assembly into a pouch according to the general method.

Comparative Example 3

(1) Preparation of Positive Electrode and Negative Electrode

A positive electrode and a negative electrode were prepared by the same procedure as in Example 1.

(2) Preparation of Electrolyte 1.15M $LiPF_6$ was added to a solvent of ethylene carbonate (EC), propylene carbonate (PC), ethyl propionate (EP), and propyl propionate (PP) (volume ratio of EC:PC:EP:PP=20:10:20:50) to prepare a first mixed solution.

Based on 100 wt % of the first a mixed solution, a compound represented by Chemical Formula 1-1 at 1 wt % and fluorinated ethylene carbonate (FEC) at 7 wt % were added thereto to prepare an electrolyte for a rechargeable lithium cell.

[Chemical Formula 1-1]

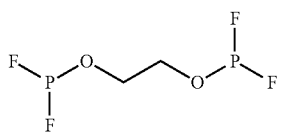

(3) Fabrication of Rechargeable Lithium Cell

Using the positive electrode and the negative electrode prepared in (1), and the electrolyte prepared in (2), a polymer full cell was fabricated by laminating the electrodes to produce an electrode assembly and inserting the electrode assembly into a pouch according to the general method.

Experimental Example 1—High Temperature Cycle-Life Characteristic

Regarding the rechargeable lithium cells according to Example 1 and Comparative Examples 1 to 3, the charging and the discharging in which it was constant-current and constant-voltage charged under 0.7 C, 4.3 V and 0.05 C cut-off condition at a high temperature (45° C.), allowed to stand for 10 minutes, discharged at constant current, 1.0 C, and 3.0 V cut-off condition, and allowed to stand for 10 minutes, was performed 500 times, and the discharge capacity was measured. The capacity retention after 500 cycles compared to the first discharge capacity was calculated and the results are shown in Table 1.

Experimental Example 2—Measurement of Resistance Characteristic

Regarding the rechargeable lithium cells according to Example 1 and Comparative Examples 1 to 3, they were stored at a high temperature (60° C.) for 7 days according to the following method, and then AC resistance was measured within the range of frequency of 10 kHz to 30 MHz using an EIS measurement device of VMP3. The measured resistance refers to charge transfer resistance of the cell thin layer, and may be a resistance of a thin layer generated via the reaction of the electrolyte and an interface side product. The results are shown in Table 1.

Experimental Example 3—Evaluation of Gas Generation after Storing at a High Temperature The rechargeable lithium cells according to Example 1 and Comparative Examples 1 to 3 was allowed to stand at a high temperature (60° C.) for 7 days, gas volume generated inside was determined by measuring the weight change of the cell in 2 L of water using the Archimedes Principle using buoyancy change occurring when a volume of a pouch is changed. The results are shown in Table 1, as the amount of the generated gas.

TABLE 1

| Division | Capacity Retention (%) | Resistance after high-temperature storage (Rct) | Amount of generated gas (ml) |
| --- | --- | --- | --- |
| Comparative Example 1 | 97% | 1.6 | 0.065 |
| Comparative Example 2 | 96% | 1.9 | 0.070 |

TABLE 1-continued

| Division | Capacity Retention (%) | Resistance after high-temperature storage (Rct) | Amount of generated gas (ml) |
| --- | --- | --- | --- |
| Comparative Example 3 | 94% | 2.45 | 0.042 |
| Example 1 | 98% | 1.5 | 0.043 |

From Table 1, the rechargeable lithium cell according to Example 1 using the electrolyte including both the first additive and the second additive exhibited better capacity retention even after high-temperature storage, very low resistance after high-temperature storage, and a significantly low amount of generated gas. Otherwise, Comparative Example 1 using no first additive or second additive and Comparative Example 2 using only the second additive exhibited an amount of generated gas of at least 1.5 times or more than Example 1.

Furthermore, Comparative Example 3 using only the first additive exhibited a similar amount of generated gas to that of Example 1, but the resistance after the high-temperature storage increased by at least 1.6 times, compared with Example 1.

Accordingly, when the electrolyte for the rechargeable lithium battery according to the embodiments of the present invention is applied to the battery, the rechargeable lithium battery exhibiting excellent cycle-life characteristics even after the high-temperature storage, and improved resistance characteristics and swelling characteristics after the high-temperature storage.

The present invention is not limited to the embodiments and but may be prepared in various forms, and it may be understood by one ordinarily skilled in the related art of the present invention to perform other specific forms without modification of the technical sprits or the essential characteristics. Thus, it must be understood that the above-described embodiments are illustrative in all respects, and are not limited thereto.

The invention claimed is:

1. An electrolyte for a rechargeable lithium battery, comprising:
    a non-aqueous organic solvent;
    a lithium salt;
    a first additive comprising a compound represented by Chemical Formula 1; and
    a second additive comprising a magnesium salt:

[Chemical Formula 1]

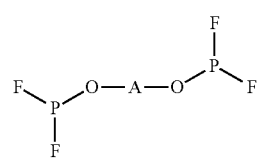

(wherein, in Chemical Formula 1, A is a substituted or unsubstituted aliphatic chain or (—$C_2H_4$—O—$C_2H_4$—)$_n$, where n is an integer of 1 to 10).

2. The electrolyte for a rechargeable lithium battery of claim 1, wherein A is a C2 to C20 hydrocarbon chain or (—$C_2H_4$—O—$C_2H_4$—)$_n$, where n is an integer of 1 to 5, in Chemical Formula 1.

3. The electrolyte for a rechargeable lithium battery of claim 1, wherein the compound represented by Chemical Formula 1 includes a compound represented by Chemical Formula 1-1:

[Chemical Formula 1-1]

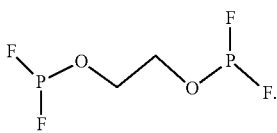

4. The electrolyte for a rechargeable lithium battery of claim 1, wherein the magnesium salt includes at least one of magnesium trifluoromethanesulfonate $(Mg(CF_3SO_3)_2)$, magnesium bis(trimethylsilyl) amide $(Mg((C_3H_9Si)_2N)_2$, and magnesium nitrate $(Mg(NO_3)_2)$.

5. The electrolyte for a rechargeable lithium battery of claim 1, wherein an amount of the first additive is 0.01 wt % to 5 wt % based on the total weight of the electrolyte for the rechargeable lithium battery.

6. The electrolyte for a rechargeable lithium battery of claim 1, wherein an amount of the second additive is 0.01 wt % to 2 wt % based on the total weight of the electrolyte for the rechargeable lithium battery.

7. The electrolyte for a rechargeable lithium battery of claim 1, wherein the amount ratio of the first additive and the second additive is 0.5:1 to 1:1.5 by weight.

8. The electrolyte for a rechargeable lithium battery of claim 1, wherein the electrolyte for the lithium secondary battery further includes an auxiliary additive comprising a fluorine atom-included cyclic carbonate.

9. The electrolyte for a rechargeable lithium battery of claim 8, wherein the fluorine atom-included cyclic carbonate includes fluorinated ethylene carbonate (FEC).

10. The electrolyte for a rechargeable lithium battery of claim 8, wherein an amount of the auxiliary additive is 1 wt % to 15 wt % of the total weight of the electrolyte for the rechargeable lithium battery.

11. A rechargeable lithium battery, comprising:
a negative electrode;
a positive electrode; and
an electrolyte of claim 1.

* * * * *